(12) United States Patent
Belmonte et al.

(10) Patent No.: US 8,208,393 B2
(45) Date of Patent: Jun. 26, 2012

(54) METHOD AND DEVICE FOR CHANNEL INSPECTION IN A COMMUNICATION SYSTEM

(75) Inventors: John P. Belmonte, Schaumburg, IL (US); Dipendra M. Chowdhary, Hoffman Estates, IL (US); Yueh Ching Chung, Georgetown (MY); Hun Weng Khoo, Penang (MY); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 12/253,391

(22) Filed: Oct. 17, 2008

(65) Prior Publication Data

US 2010/0097935 A1    Apr. 22, 2010

(51) Int. Cl.
  *H04J 1/16* (2006.01)
(52) U.S. Cl. .................................... 370/252; 370/347
(58) Field of Classification Search .................. 370/241, 370/252, 345, 347, 344, 337; 455/435, 422.1, 455/458, 455, 518
See application file for complete search history.

(56) References Cited

U.S. PATENT DOCUMENTS

| 3,617,895 | A |   | 11/1971 | Tomsa |             |
|-----------|---|---|---------|-------|-------------|
| 4,573,210 | A |   | 2/1986  | Heck  |             |
| 4,776,037 | A |   | 10/1988 | Rozanski, Jr. | |
| 5,214,790 | A | * | 5/1993  | Kozlowski et al. | 455/518 |
| 5,864,752 | A | * | 1/1999  | Pinder | 455/161.3 |
| 7,369,869 | B2 |  | 5/2008  | Wiatrowski | |
| 2006/0018292 | A1 | * | 1/2006 | Wiatrowski et al. | 370/337 |
| 2006/0274714 | A1 |   | 12/2006 | Chowdhary | |
| 2007/0254649 | A1 |   | 11/2007 | Klein et al. | |
| 2008/0165759 | A1 |   | 7/2008 | Khoo et al. | |
| 2008/0227412 | A1 |   | 9/2008 | Binowski | |

OTHER PUBLICATIONS

PCT International Search Report Dated May 3, 2010.
PCT International Search Report for Related U.S. Appl. No. 12/253,380 Dated May 3, 2010.
International Preliminary Report on Patentability & Written Opinion for International Application No. PCT/US2009/059510 dated Apr. 19, 2011.
International Preliminary Report on Patentability for related International Application No. PCT/US2009/059507 dated Apr. 19, 2011.
Notice of Allowance mailed Nov. 28, 2011, in related U.S. Appl. No. 12/253,380, Belmonte et al., filed Oct. 17, 2008.
Office Action mailed Jun. 28, 2011, in related U.S. Appl. No. 12/253,380, Belmonte et al., filed Oct. 17, 2008.

* cited by examiner

*Primary Examiner* — Kibrom T Hailu
*Assistant Examiner* — Dady Chery
(74) *Attorney, Agent, or Firm* — Valerie M. Davis; Kenneth A. Haas

(57) ABSTRACT

To perform a channel inspection, a wireless communication device: monitors a common announcement channel (CACH) until detecting that a first set of identified parameters associated with a signal on a first channel matches a second set of known parameters for the first channel; performs an inspection on the first channel to determine whether the signal is of interest; and when the signal is not of interest, marks the first channel to prevent another inspection from being performed on the first channel until after the channel mark is removed. The communication device then leaves the first channel and continues to monitor the CACH for a change in the first set of identified parameters or an indication of an idle first channel, wherein the communication device removes the channel mark on the first channel.

8 Claims, 4 Drawing Sheets

METHOD AND DEVICE FOR CHANNEL INSPECTION IN A COMMUNICATION SYSTEM

CROSS-REFERENCE TO RELATED APPLICATIONS

The present application is related to the following U.S. application commonly owned together with this application by Motorola, Inc.:

Ser. No. 12/253,380, filed Oct. 17, 2008, titled "METHOD AND DEVICE FOR CHANNEL INSPECTION IN A COMMUNICATION SYSTEM".

TECHNICAL FIELD

The technical field relates generally to wireless communication systems and more particularly to a method and device for inspecting channels in a wireless communication system.

BACKGROUND

In some communication systems, such as Time Division Multiple Access (TDMA) systems, wireless communication devices operating in these systems are required to monitor multiple channels for radio frequency (RF) activity. For example, a wireless communication device may monitor channels having different priority levels, wherein the device remains on a lower priority channel a majority of the time and periodically leaves the lower priority channel to inspect a higher priority channel for RF activity of interest. The time that it takes to inspect the higher priority channel and return to the lower priority channel (if no RF activity of interest is present) causes a hole or gap in audio being received on the lower priority channel. The length of that audio hole affects the quality of the audio signal heard by a user of the wireless communication device. Thus, it is desirable to shorten the duration of the channel inspection on the higher priority channel to a minimum amount of time in order to maximize the audio quality of an RF signal on the lower priority channel.

One method used for minimizing the duration of an audio hole is called channel marking, which uses the results from one channel inspection to make assumptions about what to expect during the next channel inspection of the same channel. During the channel marking process, if a channel is not marked, a full inspection is performed to validate whether or not RF activity on the channel is of interest. If the activity is not of interest, the channel is "marked" to cause the communication device to perform only a partial channel inspection upon next returning to the channel. The partial inspection is of a shorter duration, which thereby shortens the duration of the audio hole associated with the partial inspection. Although some current channel marking schemes exist, they generally cause audio holes from both the full inspection as well as one or more partial inspections. In addition, none of them are optimized for the situation of when the radio is monitoring one or more slots of an RF channel and periodically performing channel inspections on another slot of the same RF channel looking for RF activity of interest.

Thus, there exists a need for a method for performing channel inspections that can eliminate partial inspections in many instances.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
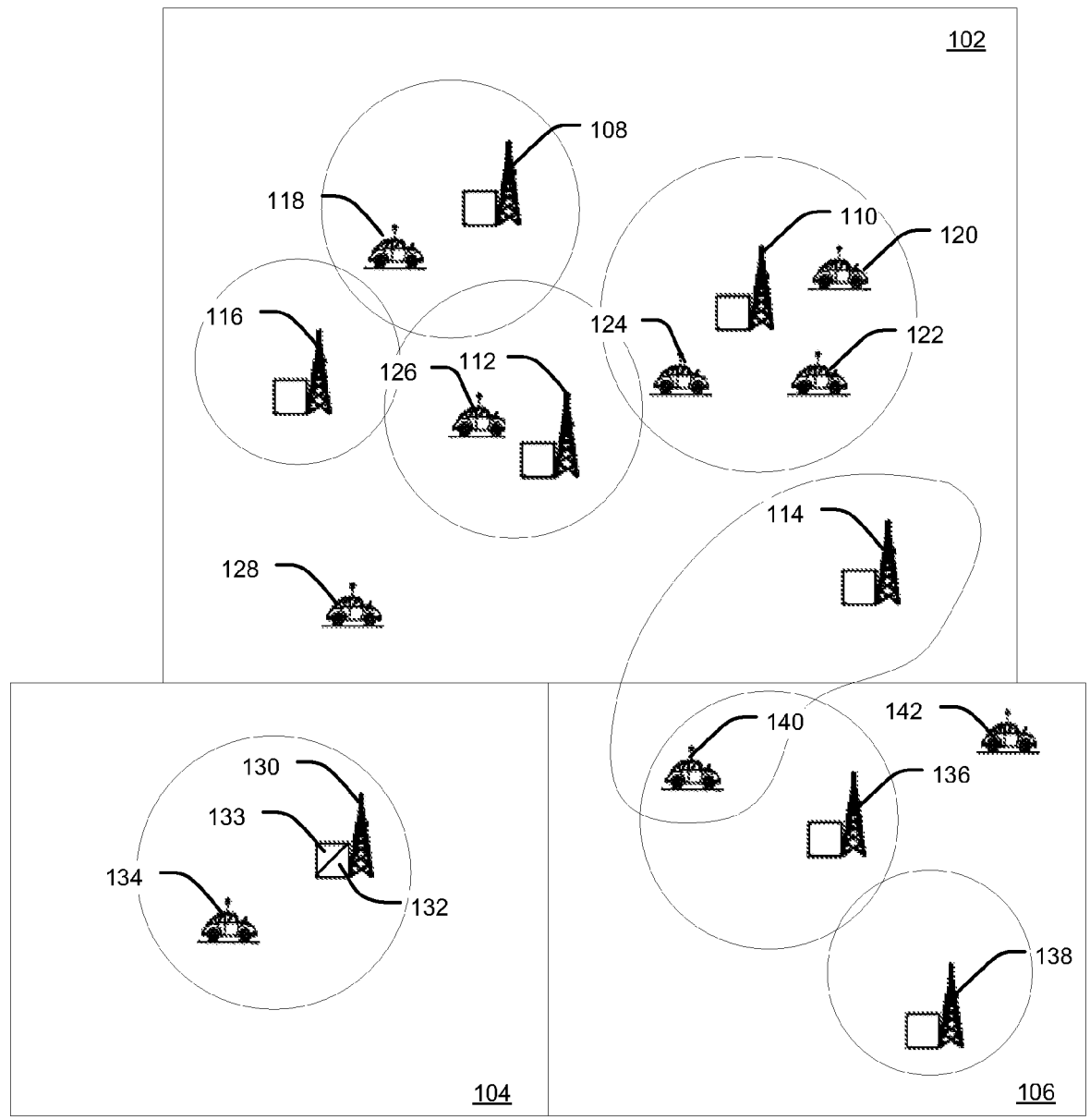
FIG. 1 is a block diagram of a wireless communication network in which may be implemented some illustrative embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, a method for inspecting a wireless communication channel is described with reference to various embodiments. In accordance with a channel inspection method, a wireless communication device monitors a common announcement channel (CACH) until detecting that a first set of identified parameters associated with a signal on a first channel matches a second set of known parameters for the first channel then performs an inspection on the first channel to determine whether the signal is of interest. If the signal is not of interest, the wireless communication device marks the first channel to prevent another inspection from being performed on the first channel, leaves the first channel, and continues to monitor the CACH. The wireless communication device removes the marking upon detecting that the CACH indicates that the first channel is idle or upon detecting a change in the first set of identified parameters.

Accordingly, instead of having to incur a large audio hole on a lower priority channel when performing a full inspection on a higher priority channel and several smaller audio holes on the lower priority channel when performing periodic partial inspections on the higher priority channel, the wireless communication device only needs to perform one inspection and, thereby, incur only one audio hole during the entire time that the first set of identified parameters remains the same. No, partial inspections are needed on the higher priority channel, so the associated smaller audio holes are not incurred and, therefore, do not degrade the audio quality of the signal on the lower priority channel. Those skilled in the art will realize that the above recognized advantages and other advantages described herein are merely illustrative and are not meant to be a complete rendering of all of the advantages of the various embodiments.

Referring now to the drawings and in particular to FIG. 1, a wireless communication network 100 is depicted in which may be implemented some illustrative embodiments. In this illustrative example, network 100 is a TDMA network in which devices can operate in the network using a Digital Mobile Radio (DMR) air interface standard, which specifies various protocols used by two-way radios (that can both transmit and receive signals) at the data link layer (i.e., layer 2) of the well known seven-layer Open Systems Interconnection computer networking model, and which is described in ETSI TS (Technical Specification) 102 361-1 v1.4.5 (2007-12) published by European Telecommunication Standards Institute (ETSI). Reference herein to the ETSI DMR standard includes the current version of the technical specification and all subsequent and future versions. The ETSI DMR standard specifies a two-slot TDMA structure that transmitting and receiving devices can utilize to send voice and/or data signals. The voice and data signals are transmitted in the TDMA slots in accordance with a general burst format specified in the standard.

Those skilled in the art, however, will recognize and appreciate that the specifics of this example are merely illustrative of some embodiments and that the teachings set forth herein are applicable in a variety of alternative settings. For example, because the teachings described do not depend on the environment, they can be applied to any type of wireless communication network or system where two or more channels share a common CACH. As such, other alternative implementations of using different types of air interface protocols and access technologies are contemplated and are within the scope of the various teachings described including, but not limited to, the Project 25 (e.g., Phase I and Phase II) suite of protocols published by APCO (Association of Public-Safety Communication Officials), the TETRA (Terrestrial Trunked Radio) set of standards developed by ETSI (European Telecommunications Standardization Institute), Code Division Multiple Access (CDMA) systems, etc. Moreover, although the embodiments describe a two-slot TDMA structure, any slotting structure can be used.

Referring again to FIG. 1, network 100 includes a system 102, a system 104, and a system 106. System 102 comprises infrastructure devices 108, 110, 112, 114 and 116. System 104 comprises an infrastructure device 130. System 106 comprises infrastructure devices 136 and 138. Each of the infrastructure devices manages two channels, or in this illustrative TDMA example timeslots (e.g., timeslots 132 and 133 shown managed by infrastructure device 130), within a coverage area or cell as indicated by the lined area enclosing the infrastructure device, wherein some infrastructure devices have partially overlapping coverage areas. Several wireless communication devices 118, 120, 122, 124, 126, 128, 134, 140, 142 operate within network 100 to communicate with each other and/or the infrastructure devices.

Each infrastructure device and wireless communication device is at least equipped with a transceiver (i.e., transmitter and receiver apparatus), a memory and a processing device and is further equipped with any additional components as needed for a commercial embodiment. The transceiver, memory and processing device can have any suitable physical implementation and are topologically coupled depending on the particular device implementation. These components are further operatively coupled and can be adapted, arranged, configured, and designed to perform methods in accordance with the teachings herein, for example, as illustratively described by reference to FIG. 2 through FIG. 4.

As referred to herein, a wireless communication device includes, but is not limited to, devices commonly referred to as access terminals, mobile radios, mobile stations, subscriber units, user equipment, mobile devices, or any other device capable of operating in a wireless environment, and are referred to hereinafter simply as radios. Examples of wireless communication devices include, but are not limited to, two-way radios, mobile phones, cellular phones, Personal Digital Assistants (PDAs), laptops and two-way pagers.

As used herein, an infrastructure device is a device that is a part of a fixed network infrastructure and can receive information (either control or media, e.g., data, voice (audio), video, etc.) in a signal from a wireless communication device and transmit information in signals to one or more wireless communication devices via a communication link. The infrastructure devices can be coupled together via wired links (not shown) and can be coupled via various other network elements such as base station controllers (also not shown), or they may be standalone devices operating independently. Thus, the use of the term "network" does not imply any connectivity between the infrastructure devices. An infrastructure device includes, but is not limited to, equipment commonly referred to as repeaters, base radios, base stations, base transceiver stations, access points, routers or any other type of infrastructure equipment interfacing a wireless communication device in a wireless environment, and is referred to hereinafter simply as a repeater.

In this illustrative embodiment, the radios communicate in "repeater mode", wherein the radios communicate through a repeater. Transmissions from a repeater to a radio in repeater mode are called outbound transmissions, and transmissions from a radio to a repeater in repeater mode are called inbound transmissions.

As mentioned earlier, the devices in network 100 communicate using communication links (also referred to herein as channels). The channels comprise physical channels and logical channels. The physical channels are the physical communication resources over which information is sent between the elements within network 100. The physical channels can comprise wired links or wireless links. If the physical channels comprise wireless links, the corresponding physical resource is an allocation of radio spectrum that is partitioned into radio frequency (RF) carriers. For TDMA, each RF carrier is partitioned in time into frames and timeslots or simply slots. The timeslots for the TDMA physical channels are labeled channel "1" and channel "2". Thus, each repeater is associated with two logical channels or slots at a single radio frequency. A physical channel is required to support a logical channel, which is a logical communication pathway between two or more parties. Logical channels are separated into two categories: traffic channels carrying speech or data information; and control channels carrying signaling, which is specifically concerned with the establishment and control of connections, and with the management of the physical channels in the network 100.

In an illustrative embodiment, a radio determines timeslot numbering by decoding a TDMA channel field in a Common Announcement Channel (CACH). The CACH is used to identify timeslots 1 and 2 and indicate the status of the timeslots, for instance, whether the timeslots are busy or idle. The CACH can also carry other information such as low speed data. In the illustrative embodiment of a two-slot TDMA system, the CACH burst is common to timeslot 1 and timeslot 2. As used herein, the terms communication and transmission are used interchangeably and refer to contiguous transmissions from one device on one channel. As it relates to TDMA, the terms communication and transmission refer to TDMA bursts emanating from one device in one timeslot. As such, transmissions may generically refer to voice, data, or control information relating to network 100. The term call refers to related voice transmissions between radios in network 100. The term signal generally refers to any detected RF activity on a channel and may, thus, generically refer to voice, data, or control information on the channel.

A burst is a period of RF carrier that is modulated by a media stream and represents the physical channel of a single timeslot. The burst is the smallest standalone unit of TDMA transmission. In an illustrative embodiment, a burst comprises 216 bits of payload and 48 bits of synchronization or embedded signaling. The defined burst takes 27.5 ms to transmit and may be followed by 2.5 ms of guard time or the CACH. Thus a burst is 30 ms, and a frame is two contiguous bursts in timeslots labeled 1 and 2 and is 60 ms.

In the wireless communication system 100, the various channels can be associated with different priority levels that may be assigned based upon some communications being perceived as more important than other communications for various reasons. For example, channels carrying emergency transmissions and/or transmissions from a supervisor may be assigned a higher priority than other transmissions in the network. Accordingly, a radio may be required to monitor channels having different priority levels in which one or more channels are designated as "low" or "lower" priority channels and some channels are designated as "high" or "higher" priority channels.

Figure 2:
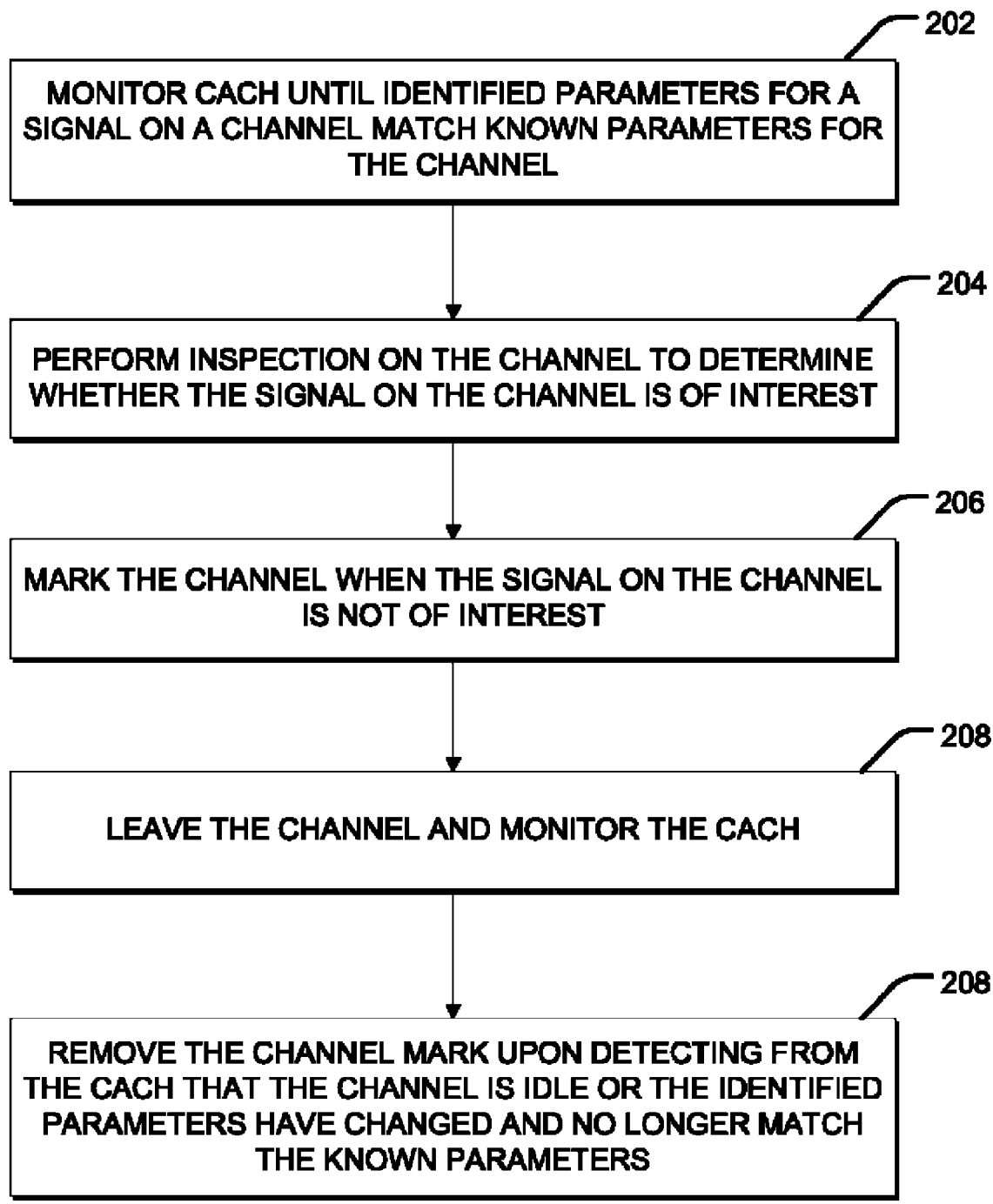
FIG. 2 is a flow diagram of a method for channel inspection in accordance with an illustrative embodiment.

FIG. 2 is a flow diagram of a method 200 for channel inspection in accordance with an illustrative embodiment that allows a device to monitor multiple channels for RF activity including, but not limited to, channels associated with differing priority levels. For purposes of describing this illustrative embodiment, only two channels are being monitored. However, in other embodiments, a radio may be monitoring more than two channels.

In accordance with method 200, a radio monitors RF activity on a first (e.g., low priority) channel and also monitors (202) a CACH that is common to the first channel and a second (e.g., high priority) channel. The radio monitors the CACH to identify a set of parameters associated with a signal currently on the second channel and determines whether this set of identified parameters matches a set of known parameters associated with the second channel. As used herein, a "set" of parameters can include one or more parameters. The one or more parameters identified by the radio can be any parameter that helps the radio to differentiate transmissions on the second channel. In one illustrative embodiment by reference to FIG. 3 and FIG. 4, the radio 134 monitors identifiers in general or shortened (e.g., hashed) identifiers in particular to differentiate transmissions on the second channel.

When the identified parameters match the known parameters, the radio leaves the first channel, starts receiving the second channel, and performs (204) an inspection on the second channel to determine whether or not the signal on the second channel is of interest. When the signal is determined to be not of interest, the radio marks (206) the second channel to prevent another channel inspection from being performed on the second channel until after the channel mark is removed. The channel mark can include storing the identified parameters.

Upon marking the second channel, the radio leaves (208) the second channel and returns to monitoring the first channel and the CACH. Upon the radio either receiving an indication from the CACH that second channel is currently idle or detecting that the identified parameters have changed and are different than any of the known parameters, the radio removes (210) the channel mark. Upon removing the channel mark, the radio returns to monitoring (202) the CACH and the first channel and repeats method 200.

Figure 3:
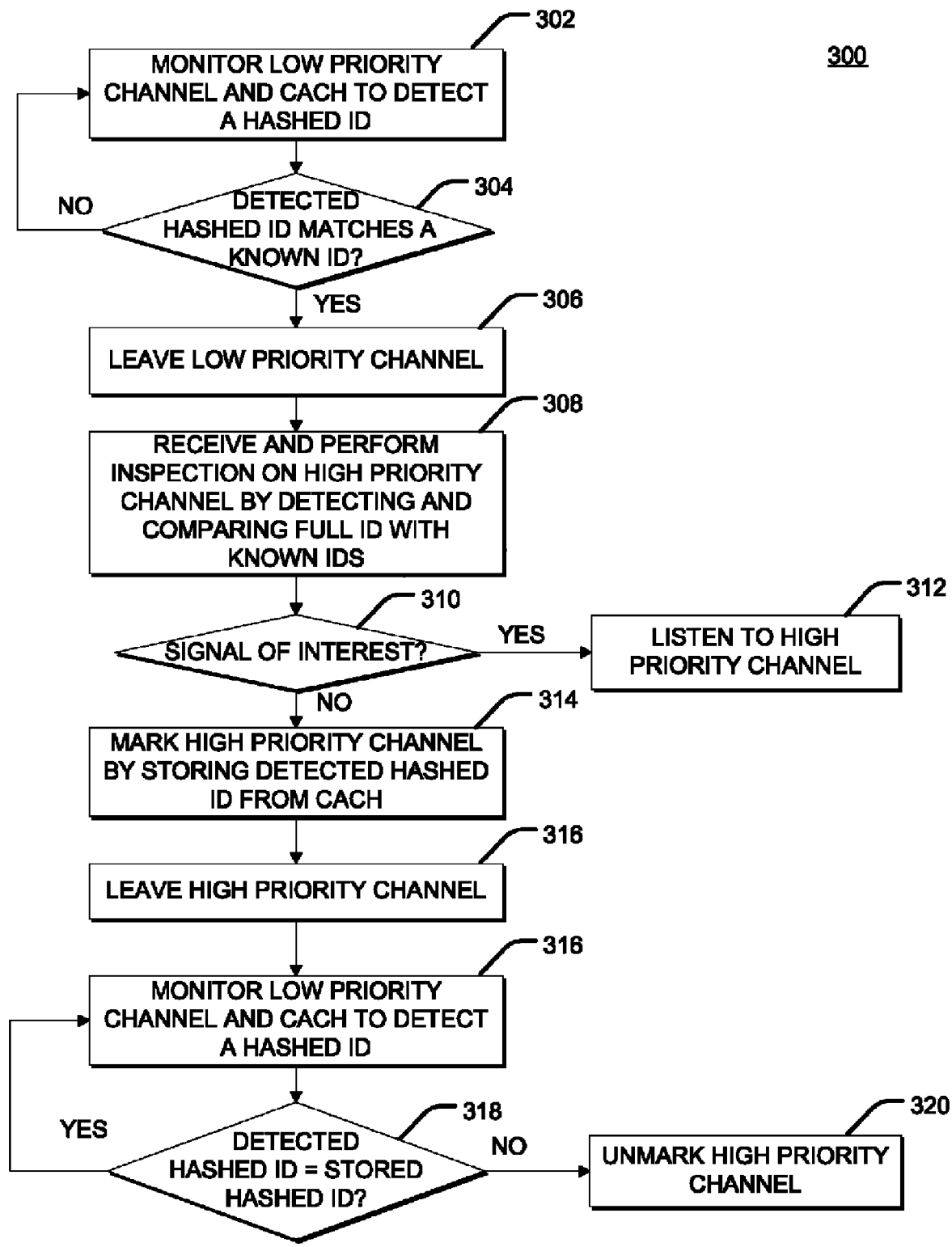
FIG. 3 is a flow diagram of a method for channel inspection in accordance with an illustrative embodiment.

FIG. 3 is a flow diagram of a method 300 for channel inspection in accordance with an illustrative embodiment that allows a device to monitor multiple TDMA slots for RF activity including, but not limited to, slots associated with differing priority levels. Method 300 will be described by reference to a timing diagram 400 in FIG. 4, which illustrates a radio monitoring two channels (slots) and a CACH in a 2-slot TDMA system. Referring momentarily again to FIG. 1, radio 134 is within the coverage area of repeater 130 and may be monitoring paired slots 132 and 133, which are managed by repeater 130. For purposes of describing this illustrative embodiment, let slot 132 be a low priority traffic channel 1, and let slot 133 be a high priority traffic channel 2. However, in other embodiments, a radio may be monitoring more than two channels or slots and/or the monitored channels or slots may have the same or no priority assignments.

In accordance with known TDMA transmission techniques, the repeater 130 alternately transmits over time bursts (e.g., 402, 410, 418) on the low priority channel 1 and bursts (e.g., 406, 414) on the high priority channel 2 with CACH bursts (e.g., 404, 408, 412, 416) transmitted in between each channel 1 and channel 2 burst pair. In one implementation scenario, voice bursts are transmitted on both channel 132 and channel 133. While in operation to perform method 300, Radio 134 monitors (302) the signal 1 on the low priority channel 132 and monitors (302) the CACH bursts. This monitoring is performed by the radio's receiver receiving the voice bursts and accompanying CACH bursts and decoding these bursts to obtain their contents using any known receiving and decoding techniques.

For example, in this implementation scenario, the radio 134, receives the voice burst 402 and the associated CACH burst 404 on the low priority channel 1. The radio decodes the voice contents (which is deemed as the radio listening to the burst for purposes of this disclosure), which are provided to a user of radio 134, and decodes the CACH contents to identify one or more parameters that the radio is monitoring in the CACH to differentiate transmissions on the high priority channel in order to determine whether the radio should leave the low priority channel and perform an inspection on the high priority channel. In this illustrative implementation, the radio monitors the CACH for an identifier (ID) that indicates whether the signal on the high priority channel might be of interest to the radio 134. The ID can be a full ID, but in this embodiment it is a shortened ID, or more particularly a hashed ID. A hash function is a procedure or mathematical function that is applied to data to generate a hashed value, hashed code, etc., which represents the data input into the hash function. The result of applying a hash function to a full ID is the generation of what is referred to herein as a hashed ID, and the use of a hashed ID is beneficial since it takes a fewer amount of bits for its transmission than its corresponding full ID. Additional examples of shortened parameters (e.g., IDs) include, but are not limited to, parameters that are truncated (e.g., where the first x bits, middle x bits, or last x bits are eliminated), decimated (e.g., where every xth bit is eliminated, compressed (e.g., generated by applying a compression algorithm to the parameter), etc.

The hashed ID can, for instance, indicate addressing for a signal currently on the high priority channel. Accordingly, the hashed ID can indicate whether the signal currently transmitted on the high priority channel might be addressed to the radio 134 or to a group of radios of which radio 134 is a member and, therefore, might be a signal of interest to the radio 134. The reason that the hashed ID only indicates that the signal might be of interest to the radio (as opposed to conclusively indicating that the signal is of interest) is because of the possibility that two or more full IDs used on the network 100 might hash to the same hashed ID. As a consequence thereof, upon detecting a hashed ID in the CACH that indicates a signal of interest, the radio performs an inspection on the high priority channel to decode the corresponding full ID in order to confirm whether or not the signal currently being transmitted on the high priority channel is indeed of interest.

Upon detecting the hashed ID in the CACH, the radio 134 compares (304) the detected hashed ID with one or more known hashed IDs that might be stored in the radio or that the radio may determine from one or more full IDs stored in the radio. If the detected hash ID does not match any of the known hashed IDs, the radio 134 assumes that signal 1 (e.g., burst 406) on the high priority channel is not of interest to the radio. Therefore, the radio receives and decodes the next voice burst 410 on the low priority channel (and provides the voice contents to the user of radio 134) and continues to monitor the CACH bursts (e.g., 408, 412) until it finds a hashed ID in the CACH that matches one of its known hashed IDs. In this case, the radio 134 detects a hashed ID in the CACH burst 412, which indicates that the signal on the high priority channel might be of interest. So, the radio: leaves (306) the low priority channel (i.e., discontinues receiving voice bursts (e.g., 418) on the low priority channel, thereby, obtaining an audio hole since it cannot provide the corresponding voice contents to the user); begins listening to the high priority channel and performs (308) an inspection on the high priority channel to determine (310) whether the signal 2 currently on the channel is or is not of interest.

The inspection, which can also be referred to as a full inspection, refers to a process of identifying information on a channel to fully qualify whether the signal on the channel is or is not of interest. At a minimum in this case, during the full inspection, the radio decodes the full ID and compares it to its stored IDs to detect whether the decoded ID matches any of the radio's known full IDs. In a DMR implementation, six voice bursts (labeled bursts A through F) are included in a DMR voice superframe, which takes 360 ms to transmit. Identifiers that indicate addressing are spread over bursts B through F. Therefore, at a maximum it may take 360 ms to find the superframe structure (first voice synchronization received), followed by an additional 300 ms to determine whether the signal is addressed to the radio and is therefore a signal of interest.

If the ID detected on channel 2 matches a known ID and signal 2 is of interest, the radio stays on the high priority channel and continues to listen (312) to signal 2. If signal 2 is not of interest, the radio channel marks (314) the high priority channel 133; leaves (316) the high priority channel 133; and returns to monitoring (318) the low priority channel 132 and the CACH. The channel marking prevents the radio from performing a channel inspection on the high priority channel until after the channel marking is removed. At a minimum, channel marking includes storing the hashed ID in the radio's memory. The radio may also remember the state of the channel marking, for instance by storing an indicator as to whether the channel marking is "TRUE" (which would tell the radio to perform a partial inspection on the high priority channel) or "FALSE".

As the radio provides the audio currently being transmitted on the low priority channel to the user, it also continues to decode the hashed ID in the CACH and compares (320) it to both the stored hashed ID from CACH 412 and to its known hashed IDs. As long as the hashed ID in the CACH remains the same, the radio continues to listen to the low priority channel. If the hashed ID in the CACH changes or if the CACH indicates that the high priority signal is idle, the radio removes (322) the channel marking, which includes erasing the stored hashed ID from CACH 412, and restarts method 300 at 302. Accordingly, the next inspection on the high priority channel is not performed until the radio 134 detects a hashed ID in the CACH that matches one of its known hashed IDs. Thus, in this illustrative implementation, the channel marking method introduces only one long audio hole and no additional short audio holes between different transmissions.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

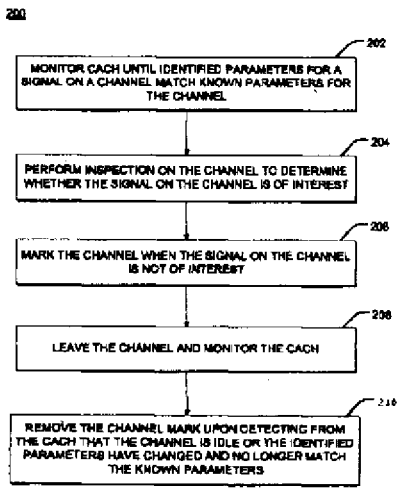

What is claimed is:

1. A method for channel inspection of a communication channel, the method comprising:
   monitoring a common announcement channel (CACH) until detecting that a first set of identified parameters associated with a signal on a first channel matches a second set of known parameters for the first channel;
   performing an inspection on the first channel to determine whether the signal is of interest;
   when the signal is not of interest, marking the first channel to prevent another inspection from being performed on the first channel until after the marking is removed;
   leaving the first channel and continuing to monitor the CACH;
   receiving an indication from the CACH that the first channel has become idle;
   after the first channel becomes idle as indicated by the CACH, removing the marking of the first channel and then again performing an inspection on the first channel.

2. The method of claim 1, wherein:
   the first set of identified parameters comprises a first identifier that matches a known identifier included in the second set of known parameters; and
   the marking comprises storing the first identifier.

3. The method of claim 2, wherein the first identifier and the known identifier comprise a shortened identifier.

4. The method of claim 2, wherein:
   removing the marking is performed upon detecting that the first set of identified parameters comprises a second identifier that is different than the first identifier and that is different than any other identifier included in the second set of known parameters; and
   removing the marking comprises erasing the first identifier.

5. The method of claim 1, wherein the first channel has a higher priority than the second channel.

6. The method of claim 1, wherein the first and second channels are first and second slots at the same radio frequency in a Time Division Multiplexing Access (TDMA) system.

7. A device for performing a channel inspection, the device comprising:
   a receiver for receiving signals on a first channel and a second channel and information on a common announcement channel (CACH); and
   a processing device coupled to the receiver for:
      monitoring the CACH until detecting that a first identifier associated with a signal on the first channel matches a known identifier for the first channel;
      performing an inspection on the first channel to determine whether the signal is of interest;
      when the signal is not of interest, marking the first channel to prevent another inspection from being performed on the first channel until after the marking is removed;
      leaving the first channel;
      monitoring a second channel and continuing to monitor the CACH;
      receiving an indication from the CACH that the first channel has become idle;
      removing the marking of the first channel and then again performing an inspection on the first channel after the first channel becomes idle as indicated by the CACH;
      wherein the second identifier is different than the first identifier and different than any known identifier for the first channel.

8. The device of claim 7, wherein the device is configured for operating in a Time Division Multiple Access (TDMA) system, and the first and second channels are first and second slots at the same radio frequency and managed by the same repeater in the TDMA system.

* * * * *

UNITED STATES PATENT AND TRADEMARK OFFICE
CERTIFICATE OF CORRECTION

PATENT NO.       : 8,208,393 B2
APPLICATION NO.  : 12/253391
DATED            : June 26, 2012
INVENTOR(S)      : Belmonte et al.

It is certified that error appears in the above-identified patent and that said Letters Patent is hereby corrected as shown below:

Delete Title Page, and replace with new Title Page. (Attached)

In the Drawings:

In Fig. 2, Sheet 2 of 4, delete "  " and insert --  --, therefor.

In Fig. 3, Sheet 3 of 4, delete "  " and insert -- 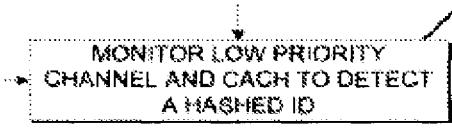 --, therefor.

In Fig. 3, Sheet 3 of 4, delete " 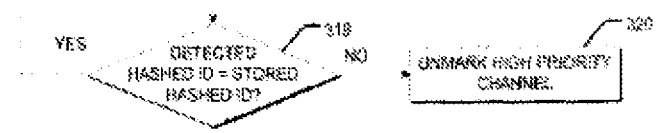 " and insert -- 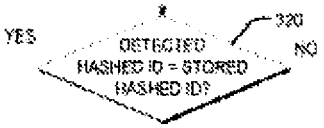 --, therefor.

Signed and Sealed this
Thirtieth Day of April, 2013

Teresa Stanek Rea
*Acting Director of the United States Patent and Trademark Office*

Figure 4:
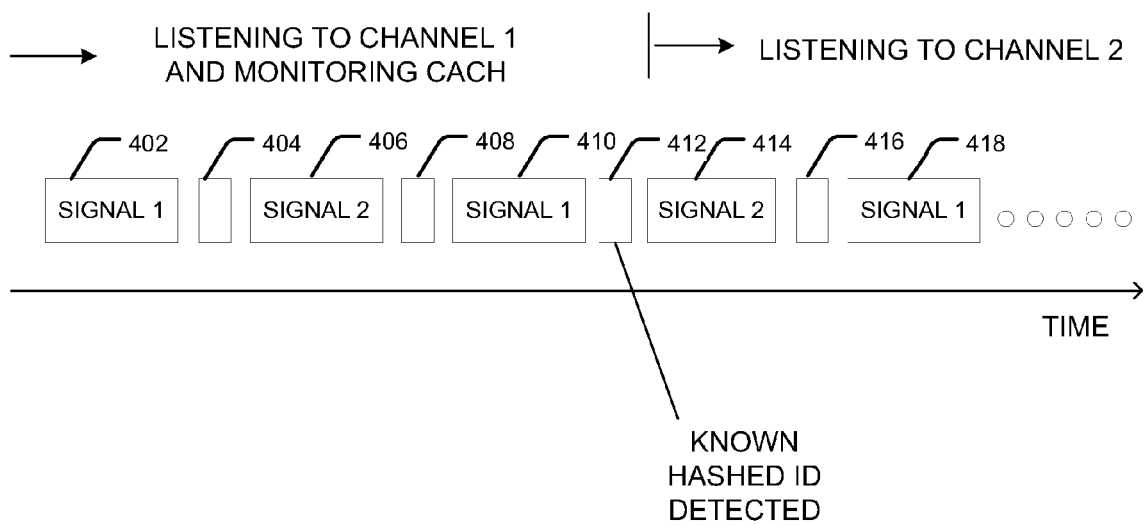
FIG. 4 is a timing diagram of transmissions in a two-slot TDMA system in which is implemented the method for channel inspection illustrated in FIG. 3.

In Fig. 4, Sheet 4 of 4, delete " [image of boxes 10, 412, 414, 416, 418 with SIGNAL 2 and SIGNAL 1] " and insert -- [image of boxes 10, 412, 414, 416, 418 with SIGNAL 2 and SIGNAL 1] --, therefor.

(12) United States Patent
Belmonte et al.

(10) Patent No.: US 8,208,393 B2
(45) Date of Patent: Jun. 26, 2012

(54) METHOD AND DEVICE FOR CHANNEL INSPECTION IN A COMMUNICATION SYSTEM

(75) Inventors: John P. Belmonte, Schaumburg, IL (US); Dipendra M. Chowdhary, Hoffman Estates, IL (US); Yueh Ching Chung, Georgetown (MY); Hun Weng Khoo, Penang (MY); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 12/253,391

(22) Filed: Oct. 17, 2008

(65) Prior Publication Data
US 2010/0097935 A1 Apr. 22, 2010

(51) Int. Cl.
*H04J 1/16* (2006.01)
(52) U.S. Cl. .................... 370/252; 370/347
(58) Field of Classification Search .......... 370/241, 370/252, 345, 347, 344, 337; 455/435, 422.1, 455/458, 455, 518
See application file for complete search history.

(56) References Cited

U.S. PATENT DOCUMENTS

| | | | |
|---|---|---|---|
| 3,617,895 A | 11/1971 | Tomsa | |
| 4,573,210 A | 2/1986 | Heck | |
| 4,776,037 A | 10/1988 | Rozanski, Jr. | |
| 5,214,790 A * | 5/1993 | Kozlowski et al. | 455/518 |
| 5,864,752 A * | 1/1999 | Pinder | 455/161.3 |
| 7,369,869 B2 | 5/2008 | Wiatrowski | |
| 2006/0018292 A1 * | 1/2006 | Wiatrowski et al. | 370/337 |
| 2006/0274714 A1 | 12/2006 | Chowdhary | |
| 2007/0254649 A1 | 11/2007 | Klein et al. | |
| 2008/0165759 A1 | 7/2008 | Khoo et al. | |
| 2008/0227412 A1 | 9/2008 | Binowski | |

OTHER PUBLICATIONS

PCT International Search Report Dated May 3, 2010.
PCT International Search Report for Related U.S. Appl. No. 12/253,380 Dated May 3, 2010.
International Preliminary Report on Patentability & Written Opinion for International Application No. PCT/US2009/059510 dated Apr. 19, 2011.
International Preliminary Report on Patentability for related International Application No. PCT/US2009/059507 dated Apr. 19, 2011.
Notice of Allowance mailed Nov. 28, 2011, in related U.S. Appl. No. 12/253,380, Belmonte et al., filed Oct. 17, 2008.
Office Action mailed Jun. 28, 2011, in related U.S. Appl. No. 12/253,380, Belmonte et al., filed Oct. 17, 2008.

* cited by examiner

*Primary Examiner* — Kibrom T Hailu
*Assistant Examiner* — Dady Chery
(74) *Attorney, Agent, or Firm* — Valerie M. Davis; Kenneth A. Haas

(57) ABSTRACT

To perform a channel inspection, a wireless communication device: monitors a common announcement channel (CACH) until detecting that a first set of identified parameters associated with a signal on a first channel matches a second set of known parameters for the first channel; performs an inspection on the first channel to determine whether the signal is of interest; and when the signal is not of interest, marks the first channel to prevent another inspection from being performed on the first channel until after the channel mark is removed. The communication device then leaves the first channel and continues to monitor the CACH for a change in the first set of identified parameters or an indication of an idle first channel, wherein the communication device removes the channel mark on the first channel.

8 Claims, 4 Drawing Sheets